(12) United States Patent
Yamaguchi et al.

(10) Patent No.: US 8,107,219 B2
(45) Date of Patent: Jan. 31, 2012

(54) DIELECTRIC CERAMIC AND CAPACITOR

(75) Inventors: Katsuyoshi Yamaguchi, Kirishima (JP); Ryota Kuki, Kirishima (JP); Hiroaki Mino, Kirishima (JP)

(73) Assignee: Kyocera Corporation, Kyoto (JP)

( * ) Notice: Subject to any disclaimer, the term of this patent is extended or adjusted under 35 U.S.C. 154(b) by 247 days.

(21) Appl. No.: 12/475,273

(22) Filed: May 29, 2009
(Under 37 CFR 1.47)

(65) Prior Publication Data
US 2010/0046140 A1 Feb. 25, 2010

Related U.S. Application Data

(63) Continuation-in-part of application No. PCT/JP2007/073060, filed on Nov. 29, 2007.

(30) Foreign Application Priority Data

| Nov. 29, 2006 | (JP) | 2006-321797 |
| Mar. 16, 2007 | (JP) | 2007-068614 |
| Mar. 23, 2007 | (JP) | 2007-076138 |
| Mar. 23, 2007 | (JP) | 2007-076140 |

(51) Int. Cl.
*H01G 4/06* (2006.01)
*C04B 35/00* (2006.01)

(52) U.S. Cl. .......... 361/321.2; 361/321.5; 501/138

(58) Field of Classification Search .... 361/321.1–321.5, 361/311; 501/136–139
See application file for complete search history.

(56) References Cited

U.S. PATENT DOCUMENTS

| 5,650,367 A | 7/1997 | Fujikawa et al. |
| 7,061,748 B2 * | 6/2006 | Ito et al. ............... 361/321.4 |
| 7,898,793 B2 * | 3/2011 | Ito et al. ............... 361/321.4 |
| 2005/0107241 A1 | 5/2005 | Umeda et al. |
| 2005/0219794 A1 * | 10/2005 | Iguchi et al. ............ 361/321.2 |
| 2008/0220964 A1 * | 9/2008 | Fujikawa et al. ......... 501/137 |
| 2008/0253060 A1 * | 10/2008 | Ito et al. ............... 361/321.4 |

FOREIGN PATENT DOCUMENTS

| JP | 04-349168 | 12/1992 |
| JP | 06-251987 | 2/1993 |
| JP | 06-012917 | 1/1994 |
| JP | 06-251986 | 9/1994 |
| JP | 08-151260 | 6/1996 |
| JP | 2001-089231 | 4/2001 |
| JP | 2001-114559 | 4/2001 |
| JP | 2001-294481 | 10/2001 |
| JP | 2001-302342 | 10/2001 |
| JP | 2005-145791 | 6/2005 |

* cited by examiner

*Primary Examiner* — Eric Thomas
(74) *Attorney, Agent, or Firm* — Birch, Stewart, Kolasch & Birch, LLP (57) ABSTRACT

The invention relates to a dielectric ceramic including crystal grains mainly composed of barium titanate. The dielectric ceramic contains 0.01 to 0.06 mole of magnesium in terms of MgO, 0.0007 to 0.03 mole of yttrium in terms of $Y_2O_3$ and 0.0002-0.03 mole of manganese in terms of MnO per 1 mole of barium constituting the barium titanate. The dielectric ceramic also contains 4.2 to 33.3 parts by mass of niobium in terms of $Nb_2O_5$ per 100 parts by mass of the barium titanate. Crystal grains of the dielectric ceramic have an average particle size of 0.05 to 0.25 μm. The invention also relates to a capacitor composed of a laminate having dielectric layer made of the dielectric ceramic and a conductive layer.

12 Claims, 6 Drawing Sheets

DIELECTRIC CERAMIC AND CAPACITOR

CROSS-REFERENCE TO RELATED APPLICATION

The present application is a continuation in part based on PCT application No. JP2007/073060, filed on Nov. 19, 2007 which claims the benefit of Japanese Patent Applications No. 2006-321797, filed on Nov. 29, 2006, entitled "DIELECTRIC CERAMICS AND CAPACITOR," No. 2007-068614, filed on Mar. 16, 2007, entitled "DIELECTRIC CERAMICS AND CAPACITOR," No. 2007-076138, filed on Mar. 23, 2007, entitled "DIELECTRIC CERAMICS AND CAPACITOR," and No. 2007-076140, filed on Mar. 16, 2007, entitled "DIELECTRIC CERAMICS AND CAPACITOR," the content of which is incorporated by reference herein in its entirety.

FIELD OF THE INVENTION

The present invention generally relates to dielectric ceramics and capacitors, more particularly relates to a dielectric ceramic including crystal grains which contain barium titanate as a main component and a capacitor including the dielectric ceramic.

BACKGROUND

Digital electronic devices such as mobile computers and cellular phones are now widely used. Digital terrestrial broadcasting will start in near future. Receivers for the digital terrestrial broadcasting are digital electronic devices such as a liquid crystal display (LCD) and plasma display. Such digital electronic devices include many LSI's therein.

Power circuits of such digital electronic devices include capacitors for bypassing. A multilayer ceramic capacitor, which includes a dielectric ceramic having a high relative dielectric constant, is used when a high capacitance is required in the circuit. On the other hand, a temperature compensating multilayer ceramic capacitor, which includes a dielectric ceramic having a stable temperature characteristic of capacitance, is used when a temperature characteristic of capacitance is important in the circuit.

When a multilayer ceramic capacitor having a high dielectric constant includes the dielectric layer which has a ferroelectric property, the rate of change in temperature of the relative dielectric constant is high and the hysteresis in electric-field versus dielectric polarization characteristic is high. Consequently, noise sound tends to be easily generated on a power supply circuit due to an electrically induced strain.

In contrast, when a multilayer ceramic capacitor is a temperature-compensating type capacitor, the dielectric layer has a paraelectric property. Therefore, the hysteresis in electric-field versus dielectric polarization characteristic is small. The resulting advantage is that this capacitor is free from the electrically induced strain inherent to the ferroelectric property. However, since the dielectric ceramic has a low relative dielectric constant, its accumulating capability is low to cause degradation of its performances as a bypass capacitor.

Therefore, there was a demand for a dielectric ceramic that has a high relative dielectric constant and a stable temperature characteristic in relative dielectric constant.

BRIEF DESCRIPTION OF THE DRAWINGS

The present invention, in accordance with one or more various embodiments, is described in detail with reference to the following Figures. The drawings are provided for purposes of illustration only and merely depict exemplary embodiments of the disclosure. These drawings are provided to facilitate the reader's understanding of the disclosure and should not be considered limiting of the breadth, scope, or applicability of the disclosure.

DETAILED DESCRIPTION OF EXEMPLARY EMBODIMENTS

The following description is presented to enable a person of ordinary skill in the art to make and use the embodiments of the disclosure. The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the invention. Furthermore, there is no intention to be bound by any expressed or implied theory presented in the preceding technical field, background, brief summary or the following detailed description. The present invention should be accorded scope consistent with the claims, and not limited to the examples described and shown herein.

Embodiments of the invention are described herein in the context of one practical non-limiting application, namely, a capacitor, especially one on a power supply circuit. Embodiments of the disclosure, however, are not limited to such capacitors, and the techniques described herein may also be utilized in other applications.

As would be apparent to one of ordinary skill in the art after reading this description, these are merely examples and the embodiments of the disclosure are not limited to operating in accordance with these examples. Other embodiments may be utilized and structural changes may be made without departing from the scope of the exemplary embodiments of the present disclosure.

Figure 1:
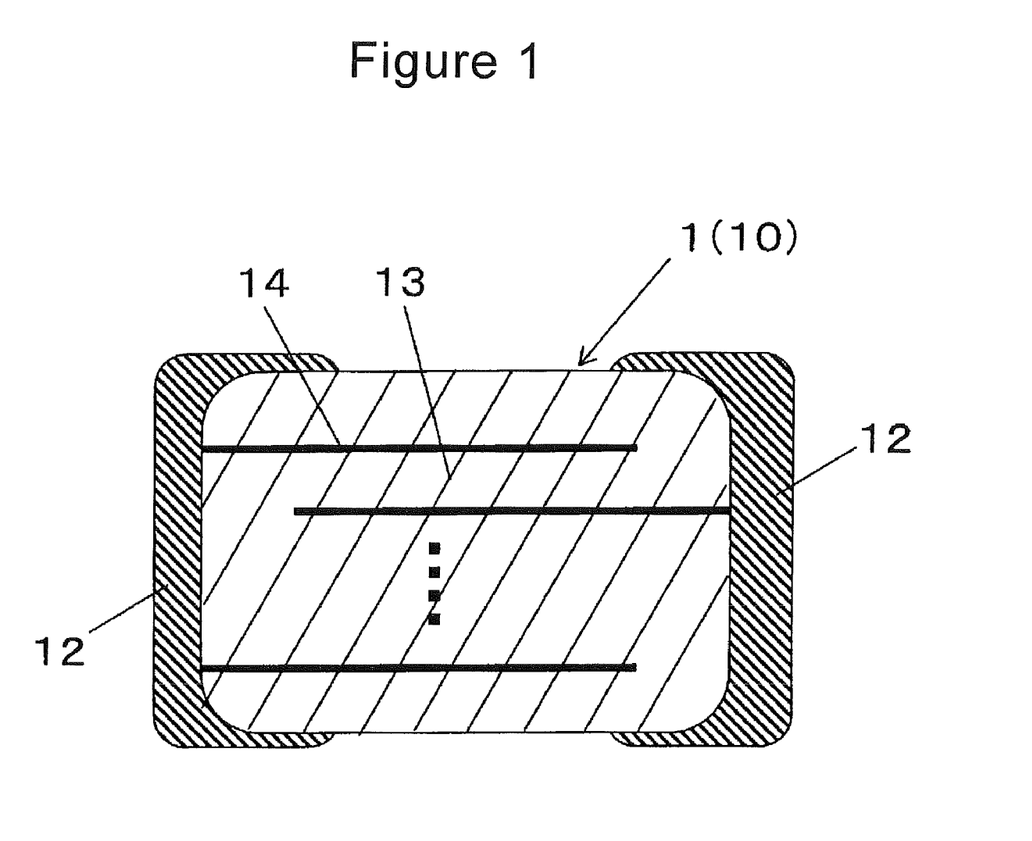
FIG. 1 is a schematic cross-sectional view illustrating a multilayer ceramic capacitor according to an embodiment of an embodiment.

FIG. 1 is a schematic cross-sectional view illustrating a multilayer ceramic capacitor according to an embodiment of the present invention. The dielectric ceramic contains barium titanate as a main component and also contains magnesium, yttrium, manganese and niobium. The molar ratios of magnesium, yttrium and manganese in the dielectric ceramic with respect to barium constituting the barium titanate are set to 0.01 to 0.06 of magnesium, 0.0014 to 0.06 of yttrium and 0.0002 to 0.03 of manganese. That is, the molar ratio of yttrium to barium titanate is equivalent to 0.0007 to 0.03 of the molar ratio of $Y_2O_3$ to barium. The mass of niobium in the dielectric ceramic is equal to that of 4.2 to 33.3 parts by mass of $Nb_2O_5$ with respect to 100 parts by mass of barium titanate.

The dielectric ceramic includes crystal grains that contain barium titanate as a main component and a grain boundary phase which is located between the crystal grains or among the crystal grains. The grain boundary phase refers to, but is not limited to amorphous phases or crystal phases, derived from the accessory component such as magnesium, yttrium, manganese and niobium. The grain boundary has formed by a liquid-phase sintering with barium titanate and the accessory components (i.e. magnesium, yttrium, manganese and niobium). In addition, the average grain size of crystal grains is about 0.05 to about 0.25 μm.

According to the present embodiment, in the dielectric ceramic, the crystal of barium titanate has a solid solution of magnesium, yttrium, manganese and niobium. The solid solution of magnesium, yttrium, manganese and niobium into barium titanate tetragonal crystal having a high ferroelectric property as well as an average grain size of the crystal in a range from about 0.05 to about 0.25 μm turns the crystal structure into a cubic system. With this structure, the ferroelectric property due to the crystal structure of the tetragonal crystals is lowered, and the paraelectric property is consequently enhanced, thereby making it possible to reduce spontaneous polarization because of the enhanced paraelectric property.

As a result, a dielectric ceramic having the above-mentioned compositions and grain sizes can achieve the relative dielectric constant at room temperature (25° C.) of 250 or more, the relative dielectric constant at 125° C. of 230 or more, and a temperature coefficient $((\epsilon_{125}-\epsilon_{25})/\epsilon_{25}(125-25))$ of relative dielectric constant in a temperature range of 25° C. to 125° C. of $1000 \times 10^{-6}$/° C. or less in its absolute value. Such a dielectric ceramic can also have a small hysteresis in electric-field versus dielectric polarization characteristic.

Turning the crystals into a cubic system can realize a flat shape of the rate of change in relative dielectric constant in a temperature range of −55° C. to 125° C. Consequently, the hysteresis in the electric field versus dielectric polarization characteristic becomes small. For this reason, even if the relative dielectric constant can be 250 or more, a temperature coefficient of relative dielectric constant of a dielectric ceramic can be small.

In other words, when magnesium, yttrium and manganese are contained in barium titanate in the above-mentioned range, a dielectric ceramic can have a Curie temperature of 25° C. or more and have a positive value in its temperature coefficient in relative dielectric constant. In addition, when niobium is further added a dielectric ceramic having such a dielectric property, the temperature coefficient of relative dielectric constant can be smaller and the temperature characteristic can be further flattened. In this case, the curve of the rate of change in relative dielectric constant may have two peaks, centered on 25° C. in the temperature range from −55° C. to 125° C. In other words, one peak may appear between −55° C. and 25° C. and the other peak may appear between 25° C. and 125° C.

Here, niobium may prevent the crystals from significant grain growth. The mass ratio of niobium to barium titanate may be equivalent to 4.2 to 33.3 parts by mass of $Nb_2O_5$ with respect to 100 parts by mass of barium titanate.

When the mass ratio of niobium to barium titanate is equivalent to less than 4.2 parts by mass of $Nb_2O_5$ with respect to 100 parts by mass of barium titanate, the resultant dielectric ceramic has a high temperature coefficient in relative dielectric constant, as well as a high relative dielectric constant. In contrast, when the mass ratio of niobium to barium titanate is equivalent to more than 33.3 parts by mass of $Nb_2O_5$ with respect to 100 parts by mass of barium titanate, the relative dielectric constant at 25° C. may be lower than about 250, and the relative dielectric constant at 125° C. may be less than about 230.

The molar ratio of magnesium may be 0.01 to 0.06 with respect to barium, the molar ratio of yttrium may be 0.0014 to 0.06 with respect to barium, and the molar ratio of manganese may be 0.0002 to 0.03 with respect to barium. When the molar ratio of magnesium is less than 0.01 with respect to barium, or when the molar ratio of magnesium is more than 0.06 with respect to barium, the resultant dielectric ceramic may have a high temperature coefficient in relative dielectric constant. When the molar ratio of yttrium is less than 0.0014 with respect to barium, or when the molar ratio of yttrium is more than 0.06 with respect to barium, the resultant dielectric ceramic has a high temperature coefficient in relative dielectric constant, even though it may have a high relative dielectric constant. Furthermore, when the molar ratio of manganese per 1 mole of barium is less than 0.0002, or when the molar ratio of manganese per 1 mole of barium is more than 0.03, the resultant dielectric ceramic may have a high temperature coefficient in relative dielectric constant.

The average grain size of the crystal grains in the dielectric ceramic is about 0.05 to about 0.25 μm, according to the present embodiment. By setting the average grain size in a range from about 0.05 to about 0.25 μm, the crystal grains including barium titanate as a main component are allowed to have a crystal structure mainly comprising a cubic system, and the hysteresis in electric-field versus dielectric polarization characteristic may be small so as to exhibit a property close to the paraelectric property. In contrast, when the average grain size is smaller than about 0.05 μm, since no effect of oriented polarization is exerted, the relative dielectric constant of the dielectric ceramic may be low. In addition, when the average grain size is greater than about 0.25 μm, a crystal phase of a tetragonal system may be observed by X-ray diffraction, and the dielectric ceramic may have a high temperature coefficient in relative dielectric constant.

The crystal structure mainly comprising a cubic system refers to a structure in which the intensity of an X-ray diffraction peak on the (110) plane that is the strongest peak in barium titanate of the cubic system is greater than the intensity of an X-ray diffraction peak of the different phase.

The average grain size of the crystal grains may be between about 0.14 and about 0.18 μm. In this size range, a polarization charge of the dielectric ceramic at 0V can be 20 nC/cm² or less in the electric-field versus dielectric polarization characteristic.

The mass ratio of niobium to barium titanate may be equivalent to 6.3 to 15.6 parts by mass of $Nb_2O_5$ with respect to 100 parts by mass of barium titanate, and the molar ratio of titanium with respect to barium may be 0.97 to 0.98. The molar ratios of magnesium, yttrium and manganese to barium may be 0.017 to 0.06, 0.010 to 0.02, and 0.01 to 0.03, respectively. The dielectric ceramic with the above composition, the relative dielectric constant at 25° C. can be 400 or more, the relative dielectric constant at 125° C. can be 380 or more, and the temperature coefficient in relative dielectric constant can be $400 \times 10^{-6}$/° C. or less in the absolute value.

Here, the average grain size of crystal grains can be measured, without limitation, with using a scanning electron microscope as described later.

The relative dielectric constants at 25° C. and 125° C. may be calculated, without limitation, from measured values by using an LCR meter as described later.

The dielectric ceramic may further contain silicon, boron. The mass of silicon thereof is set equal to 0.73 to 6.3 parts by mass of $SiO_2$ with respect to 100 parts by mass of barium titanate, and the mass of boron thereof is set equal to 0.31 to 2.1 parts by mass of $B_2O_3$ with respect to 100 parts by mass of barium titanate.

The dielectric ceramic may further contain silicon and lithium. The mass of silicon thereof is set equal to 0.73 to 6.3 parts by mass of $SiO_2$ with respect to 100 parts by mass of barium titanate, and the mass of lithium thereof is set equal to 0.31 to 2.1 parts by mass of $Li_2O$ with respect to 100 parts by mass of barium titanate.

Silicon/boron or silicon/lithium contained therein may enhance the liquid-phase sintering. In other words, the combination of these elements may lower the sintering temperature of the dielectric ceramic to the temperature range from 1100 to 1250° C.

If silicon/boron or silicon/lithium are contained therein the average grain size of the crystal grains may be set in a range from 0.15 to 0.2 μm in order to achieve the polarization charge of 20 nC/cm$^2$ or less at 0V in the electric-field versus dielectric polarization characteristic.

The following description will discuss the method for producing a dielectric ceramic.

$BaCO_3$ powder, $TiO_2$ powder, MgO powder, $Y_2O_3$ powder and manganese carbonate ($MnCO_3$) powder, each having a purity of 99% or more, are used as raw materials. These powders are respectively blended so as to contain the ratios of 0.01 to 0.06 mole of MgO per 1 mole of barium constituting barium titanate, 0.0007 to 0.03 mole of $Y_2O_3$ per 1 mole of barium constituting barium titanate and 0.0002 to 0.03 mole of $MnCO_3$ per 1 mole of barium constituting barium titanate.

The mixture of the powders are wet-mixtured, and after having been dried, this is calcined at a temperature in a range from 900 to 1100° C. so that calcined powder is produced, and this calcined powder is pulverized. At this time, the powder grain is allowed to grow so that the crystal structure of the calcined powder may become mainly a cubic system; thus, it is possible to obtain a dielectric ceramic that has a high dielectric constant, while maintaining a temperature characteristic in relative dielectric constant close to the paraelectric property.

The average grain size of the calcined powder may be set to 0.04 to 0.1 μm. Thus, the calcined powder may avoid to have a ferroelectric property. The average grain size of the calcined powder is measured, without limitation, by using a scanning electron microscope.

Then, the $Nb_2O_5$ powder is added to the calcined powder to be mixed. The mass of $Nb_2O_5$ powder is 4.0 to 32 parts by mass with respect to 100 parts by mass of the calcined powder.

If silicon and boron are added therein, 0.7 to 6.0 parts by mass of $SiO_2$ powder and 0.3 to 2.0 parts by mass of $B_2O_3$ powder with respect to 100 parts by mass of the calcined powder are added respectively and then mixed.

In the same manner, if silicon and lithium are added therein, 0.7 to 6.0 parts by mass of $SiO_2$ powder and 0.3 to 2.0 parts by mass of $Li_2O$ power with respect to 100 parts by mass of the calcined powder are added respectively and then mixed.

Thereafter, the mixed powder is molded into pellets, and the pellets are sintered at a temperature in a range of 1150° C. to 1250° C. in the atmosphere to obtain dielectric ceramics. If the sintering temperature is lower than 1150° C., the density of the dielectric ceramic may be low due to a lack of grain growth and densification of crystal grains. In contrast, if the sintering temperature is higher than 1250° C., the crystal grains of the dielectric ceramic may have unnecessarily too much grain growth.

Adding $SiO_2/B_2O_3$ or $SiO_2/Li_2O$ thereto in the above-mentioned composition can lower the sintering temperature. Moreover, although it is generally supposed that the ceramic grains easily grow in a liquid-phase sintering process, the above-mentioned composition can suppress an extreme grain growth even in the liquid-phase sintering process.

The molded pellets of the mixed powder containing $SiO_2/B_2O_3$ or $SiO_2/Li_2O$ can be sintered at a temperature in a range of 1100° C. to 1250° C. in the atmosphere to obtain a dielectric ceramic.

The following description discusses the capacitor according to one embodiment of the present invention.

The following capacitor can be manufactured, using the above-mentioned dielectric ceramic.

As shown FIG. 1, the capacitor comprises a laminated body 1 which includes external electrodes 12 on the two ends of the capacitor main body 10. The capacitor main body 10 includes a laminated body 1 in which a plurality of dielectric layers 13 and a plurality of conductor layers 14 serving as inner electrode layers are alternately laminated. The dielectric layers 13 are made of the dielectric ceramic of the present embodiment. In other words, the capacitor can have a higher capacity and more stable capacity temperature characteristic than an existing capacitor by using the dielectric ceramic with a high dielectric constant, with a stable temperature characteristic in relative dielectric constant, and with a small spontaneous polarization, as the dielectric layers 13. Therefore, this capacitor can reduce a noise sound caused by an electrically induced strain in a power supply circuit.

The dielectric layer 13 may have the thickness of 1 to 30 μm. In addition, the thinning of the dielectric layer 13 such as the thickness of the dielectric layer 13 is 5 μm or less may increase the electrostatic capacity of the capacitor.

The conductor layer 14 is, without limitation, made of base metals, such as Ni and Cu in order to reduce the manufacturing cost. In particular, the conductor layer 14 may be Ni to easily carry out a simultaneous sintering with the dielectric layer 13. The thickness of the conductor layer 14 is set to, without limitation, 1 μm or less on average.

The aforementioned mixed powder is molded onto a green sheet to manufacture such a capacitor. A conductive paste for forming the conductor layer 14 is prepared and then applied on the surface of the green sheet. The resultant sheets are laminated, and then sintered to form the laminated green body 1. Thereafter, the conductor paste is further applied to the two end faces of the laminated green body 1 for forming external electrodes 12, and the resultant laminated body 1 is sintered to obtain a capacitor of the present embodiment.

The following examples further explain the present invention in detail; however, the present invention is not limited to these examples.

EXAMPLE

First, $BaCO_3$ powder, $TiO_2$ powder, MgO powder, $Y_2O_3$ powder and $MnCO_3$ powder, each having a purity of 99.9%, were provided, and these were blended at compounding ratios shown in Table 1 to 3 so that mixed powder was prepared. Here, the amounts of magnesium (Mg), yttrium (Y) and manganese (Mn) are shown in Table 1 as a molar ratio of MgO, $Y_2O_3$ and MnO with respect to 1 mole of Ba respectively. Here, yttrium content was indicated by the molar ratio of $Y_2O_3$ to barium. Note that the molar ratio of yttrium to barium is twice of the molar ratio of $Y_2O_3$ to barium. The amount of titanium (Ti) is indicated by a molar ratio to 1 mole of barium (Ba).

The mixed powder prepared as described above was calcined at 1000° C., and the resultant calcined powder was pulverized to obtain calcined powder having an average particle size shown in Table 1 to 3. The average particle size of the calcined powder was measured by the following processes: the particles of the calcined powder was scattered on the sample stage of a scanning electron microscope, photograph of the particles were taken, profiles of the particles on the photograph were image-processed, the diameter of each particle was measured and the average value thereof was calculated with an assumption that each particle is round with the same area. The magnification of the photograph was set to 30,000 times, and the number of particles observed was set to three for each of the specimens to calculate the average value.

Here, the average grain size of crystal grains can be measured in the following processes. A fractured surface of a sintered dielectric ceramic is polished and then the microstructure thereof is then photographed with a scanning electron microscope. Then, profiles of the crystal grains appearing on the photograph are image-processed, and the diameter of each particle is measured with an assumption that each particle is a round with the same area. The magnification of the photograph, without limitation, is about 30,000 times, and the number of grains observed is, without limitation, three for each of the samples, and then the average value thereof was calculated.

Thereafter, $Nb_2O_5$ powder having a purity of 99.9% was mixed with 100 parts by weight of the calcined powder at a ratio shown in Table 1. In addition, $Nb_2O_5$ powder, $SiO_2$ powder and $B_2O_3$ powder, each having a purity of 99.9%, were mixed with 100 parts by weight of the calcined powder at ratios shown in Table 2. Furthermore, $Nb_2O_5$ powder, $SiO_2$ powder and $Li_2O$ powder, each having a purity of 99.9%, were mixed with 100 parts by weight of the temporarily sintered powder at ratios shown in Table 3. These mixed powders were respectively granulated, and molded into pellets having a diameter of 16.5 mm and a thickness of 1 mm.

Next, ten pieces of pellets for each composition were sintered at a temperature shown in Table 1 to 3 in the atmosphere. The average grain size of crystal grains including barium titanate as a main component was measured in the following processes. First, the fractured surface of a sintered sample was roughly polished with a polishing paper of #1200, and was then subjected to a polishing process by using a diamond paste having a grain size of 3 μmapplied on a hard buff, and this was further subjected to a finish polishing process by using a soft buff with alumina abrasive grains applied thereon and having a grain size of 0.3 μm.

Next, the resultant fractured surface was etched by an acidic aqueous solution (hydrochloric acid-hydrogen fluoride), and the inner microstructure thereof was then photographed with a scanning electron microscope. Then, profiles of the crystal grains appearing on the photograph were image-processed, and the diameter of each particle was measured and the average value thereof was calculated with an assumption that each particle is a round with the same area. The magnification of the photograph was set to about 30,000 times, and the number of grains observed was set to three for each of the samples, and then the average value thereof was calculated.

TABLE 1

| Sample No. | Composition Molar ratios with respect to Ba | | | | | $Nb_2O_5$ parts by mass | Avarage Particle Size of Calsinated Powder μm | Sintering Temperature ° C. |
| --- | --- | --- | --- | --- | --- | --- | --- | --- |
| | Ba | Mg | Y | Mn | Ti | | | |
| 1 | 1 | 0.02 | 0.01 | 0.01 | 0.98 | 2.0 | 0.1 | 1200 |
| 2 | 1 | 0.02 | 0.01 | 0.01 | 0.98 | 4.2 | 0.1 | 1200 |
| 3 | 1 | 0.02 | 0.01 | 0.01 | 0.98 | 6.0 | 0.1 | 1200 |
| 4 | 1 | 0.02 | 0.01 | 0.01 | 0.98 | 8.5 | 0.1 | 1200 |
| 5 | 1 | 0.02 | 0.01 | 0.01 | 0.98 | 15.0 | 0.1 | 1200 |
| 6 | 1 | 0.02 | 0.01 | 0.01 | 0.98 | 18.5 | 0.1 | 1200 |
| 7 | 1 | 0.02 | 0.01 | 0.01 | 0.98 | 32.0 | 0.1 | 1200 |
| 8 | 1 | 0.02 | 0.01 | 0.01 | 0.98 | 50.0 | 0.1 | 1200 |
| 9 | 1 | 0.02 | 0.0002 | 0.01 | 0.98 | 8.5 | 0.1 | 1200 |
| 10 | 1 | 0.02 | 0.0007 | 0.01 | 0.98 | 8.5 | 0.1 | 1200 |
| 11 | 1 | 0.02 | 0.0015 | 0.01 | 0.98 | 8.5 | 0.1 | 1200 |
| 12 | 1 | 0.02 | 0.005 | 0.01 | 0.98 | 8.5 | 0.1 | 1200 |
| 13 | 1 | 0.02 | 0.007 | 0.01 | 0.98 | 8.5 | 0.1 | 1200 |
| 14 | 1 | 0.02 | 0.03 | 0.01 | 0.98 | 8.5 | 0.1 | 1200 |
| 15 | 1 | 0.02 | 0.04 | 0.01 | 0.98 | 8.5 | 0.1 | 1200 |
| 16 | 1 | 0.005 | 0.01 | 0.01 | 0.98 | 8.5 | 0.1 | 1200 |
| 17 | 1 | 0.01 | 0.01 | 0.01 | 0.98 | 8.5 | 0.1 | 1200 |
| 18 | 1 | 0.017 | 0.01 | 0.01 | 0.98 | 8.5 | 0.1 | 1200 |
| 19 | 1 | 0.023 | 0.01 | 0.01 | 0.98 | 8.5 | 0.1 | 1200 |
| 20 | 1 | 0.06 | 0.01 | 0.01 | 0.98 | 8.5 | 0.1 | 1200 |
| 21 | 1 | 0.07 | 0.01 | 0.01 | 0.98 | 8.5 | 0.1 | 1200 |
| 22 | 1 | 0.02 | 0.01 | 0.0002 | 0.98 | 8.5 | 0.1 | 1200 |
| 23 | 1 | 0.02 | 0.01 | 0.005 | 0.98 | 8.5 | 0.1 | 1200 |
| 24 | 1 | 0.02 | 0.01 | 0.008 | 0.98 | 8.5 | 0.1 | 1200 |
| 25 | 1 | 0.02 | 0.01 | 0.015 | 0.98 | 8.5 | 0.1 | 1200 |
| 26 | 1 | 0.02 | 0.01 | 0.03 | 0.98 | 8.5 | 0.1 | 1200 |
| 27 | 1 | 0.02 | 0.01 | 0.04 | 0.98 | 8.5 | 0.1 | 1200 |
| 28 | 1 | 0.02 | 0.01 | 0.01 | 0.97 | 8.5 | 0.1 | 1200 |
| 29 | 1 | 0.02 | 0.01 | 0.01 | 0.99 | 8.5 | 0.1 | 1200 |
| 30 | 1 | 0.02 | 0.01 | 0 | 0.98 | 8.5 | 0.1 | 1200 |
| 31 | 1 | 0.02 | 0.03 | 0.01 | 0.98 | 8.5 | 0.04 | 1200 |
| 32 | 1 | 0.02 | 0.03 | 0.01 | 0.98 | 8.5 | 0.04 | 1100 |
| 33 | 1 | 0.02 | 0.01 | 0.01 | 0.98 | 4.0 | 0.1 | 1280 |
| 34 | 1 | 0.02 | 0.01 | 0.01 | 0.98 | 8.5 | 0.1 | 1150 |
| 35 | 1 | 0.02 | 0.01 | 0.01 | 0.98 | 8.5 | 0.1 | 1250 |

TABLE 2

| Sample No. | Composition | | | | | Ratios with respect to 100 parts by mass of Barium Titanate | | | Avarage Particle Size of Calsined Powder μm | Sintering Temperature ° C. |
|---|---|---|---|---|---|---|---|---|---|---|
| | Molar ratios with respect to Ba | | | | | $Nb_2O_5$ parts by mass | $SiO_2$ parts by mass | $B_2O_3$ parts by mass | | |
| | Ba | Mg | Y | Mn | Ti | | | | | |
| 36 | 1 | 0.020 | 0.010 | 0.010 | 0.980 | 2 | 1.5 | 0.5 | 0.1 | 1200 |
| 37 | 1 | 0.020 | 0.010 | 0.010 | 0.980 | 3.5 | 1.5 | 0.5 | 0.1 | 1200 |
| 38 | 1 | 0.020 | 0.010 | 0.010 | 0.980 | 4 | 1.5 | 0.5 | 0.1 | 1200 |
| 39 | 1 | 0.020 | 0.010 | 0.010 | 0.980 | 6 | 1.5 | 0.5 | 0.1 | 1200 |
| 40 | 1 | 0.020 | 0.010 | 0.010 | 0.980 | 8.5 | 1.5 | 0.5 | 0.1 | 1200 |
| 41 | 1 | 0.020 | 0.010 | 0.010 | 0.980 | 15 | 1.5 | 0.5 | 0.1 | 1200 |
| 42 | 1 | 0.020 | 0.010 | 0.010 | 0.980 | 18.5 | 1.5 | 0.5 | 0.1 | 1200 |
| 43 | 1 | 0.020 | 0.010 | 0.010 | 0.980 | 32 | 1.5 | 0.5 | 0.1 | 1200 |
| 44 | 1 | 0.020 | 0.010 | 0.010 | 0.980 | 50 | 1.5 | 0.5 | 0.1 | 1200 |
| 45 | 1 | 0.020 | 0.0002 | 0.010 | 0.980 | 8.5 | 1.5 | 0.5 | 0.1 | 1200 |
| 46 | 1 | 0.020 | 0.0007 | 0.010 | 0.980 | 8.5 | 1.5 | 0.5 | 0.1 | 1200 |
| 47 | 1 | 0.020 | 0.0015 | 0.010 | 0.980 | 8.5 | 1.5 | 0.5 | 0.1 | 1200 |
| 48 | 1 | 0.020 | 0.005 | 0.010 | 0.980 | 8.5 | 1.5 | 0.5 | 0.1 | 1200 |
| 49 | 1 | 0.020 | 0.007 | 0.010 | 0.980 | 8.5 | 1.5 | 0.5 | 0.1 | 1200 |
| 50 | 1 | 0.020 | 0.030 | 0.010 | 0.980 | 8.5 | 1.5 | 0.5 | 0.1 | 1200 |
| 51 | 1 | 0.020 | 0.040 | 0.010 | 0.980 | 8.5 | 1.5 | 0.5 | 0.1 | 1200 |
| 52 | 1 | 0.005 | 0.010 | 0.010 | 0.980 | 8.5 | 1.5 | 0.5 | 0.1 | 1200 |
| 53 | 1 | 0.010 | 0.010 | 0.010 | 0.980 | 8.5 | 1.5 | 0.5 | 0.1 | 1200 |
| 54 | 1 | 0.017 | 0.010 | 0.010 | 0.980 | 8.5 | 1.5 | 0.5 | 0.1 | 1200 |
| 55 | 1 | 0.023 | 0.010 | 0.010 | 0.980 | 8.5 | 1.5 | 0.5 | 0.1 | 1200 |
| 56 | 1 | 0.040 | 0.010 | 0.010 | 0.980 | 8.5 | 1.5 | 0.5 | 0.1 | 1200 |
| 57 | 1 | 0.060 | 0.010 | 0.010 | 0.980 | 8.5 | 1.5 | 0.5 | 0.1 | 1200 |
| 58 | 1 | 0.070 | 0.010 | 0.010 | 0.980 | 8.5 | 1.5 | 0.5 | 0.1 | 1200 |
| 59 | 1 | 0.020 | 0.010 | 0.0002 | 0.980 | 8.5 | 1.5 | 0.5 | 0.1 | 1200 |
| 60 | 1 | 0.020 | 0.010 | 0.005 | 0.980 | 8.5 | 1.5 | 0.5 | 0.1 | 1200 |
| 61 | 1 | 0.020 | 0.010 | 0.008 | 0.980 | 8.5 | 1.5 | 0.5 | 0.1 | 1200 |
| 62 | 1 | 0.020 | 0.010 | 0.013 | 0.980 | 8.5 | 1.5 | 0.5 | 0.1 | 1200 |
| 63 | 1 | 0.020 | 0.010 | 0.015 | 0.980 | 8.5 | 1.5 | 0.5 | 0.1 | 1200 |
| 64 | 1 | 0.020 | 0.010 | 0.030 | 0.980 | 8.5 | 1.5 | 0.5 | 0.1 | 1200 |
| 65 | 1 | 0.020 | 0.010 | 0.040 | 0.980 | 8.5 | 1.5 | 0.5 | 0.1 | 1200 |
| 66 | 1 | 0.020 | 0.010 | 0.010 | 0.970 | 8.5 | 1.5 | 0.5 | 0.1 | 1200 |
| 67 | 1 | 0.020 | 0.010 | 0.010 | 0.990 | 8.5 | 1.5 | 0.5 | 0.1 | 1200 |
| 68 | 1 | 0.020 | 0.010 | 0 | 0.980 | 8.5 | 1.5 | 0.5 | 0.1 | 1200 |
| 69 | 1 | 0.020 | 0.010 | 0.010 | 0.980 | 8.5 | 0.7 | 0.3 | 0.1 | 1250 |
| 70 | 1 | 0.020 | 0.010 | 0.010 | 0.980 | 8.5 | 2.5 | 0.5 | 0.1 | 1170 |
| 71 | 1 | 0.020 | 0.010 | 0.010 | 0.980 | 8.5 | 3 | 1 | 0.1 | 1150 |
| 72 | 1 | 0.020 | 0.010 | 0.010 | 0.980 | 8.5 | 4.5 | 1.5 | 0.1 | 1150 |
| 73 | 1 | 0.020 | 0.010 | 0.010 | 0.980 | 8.5 | 6 | 2 | 0.1 | 1100 |
| 74 | 1 | 0.020 | 0.030 | 0.010 | 0.980 | 8.5 | 1.5 | 0.5 | 0.04 | 1200 |
| 75 | 1 | 0.020 | 0.030 | 0.010 | 0.980 | 8.5 | 1.5 | 0.5 | 0.04 | 1160 |
| 76 | 1 | 0.020 | 0.010 | 0.010 | 0.980 | 8.5 | 1.5 | 0.5 | 0.1 | 1230 |

TABLE 3

| Sample No. | Composition | | | | | Ratios with respect to 100 parts by mass of Barium | | | Avarage Particle Size of Calsined Powder μm | Sintering Temperature ° C. |
|---|---|---|---|---|---|---|---|---|---|---|
| | Molar ratios with respect to Ba | | | | | $Nb_2O_5$ parts by mass | $SiO_2$ parts by mass | $B_2O_3$ parts by mass | | |
| | Ba | Mg | Y | Mn | Ti | | | | | |
| 77 | 1 | 0.020 | 0.010 | 0.010 | 0.980 | 2 | 1.5 | 0.5 | 0.1 | 1200 |
| 78 | 1 | 0.020 | 0.010 | 0.010 | 0.980 | 3.5 | 1.5 | 0.5 | 0.1 | 1200 |
| 79 | 1 | 0.020 | 0.010 | 0.010 | 0.980 | 4 | 1.5 | 0.5 | 0.1 | 1200 |
| 80 | 1 | 0.020 | 0.010 | 0.010 | 0.980 | 6 | 1.5 | 0.5 | 0.1 | 1200 |
| 81 | 1 | 0.020 | 0.010 | 0.010 | 0.980 | 8.5 | 1.5 | 0.5 | 0.1 | 1200 |
| 82 | 1 | 0.020 | 0.010 | 0.010 | 0.980 | 15 | 1.5 | 0.5 | 0.1 | 1200 |
| 83 | 1 | 0.020 | 0.010 | 0.010 | 0.980 | 18.5 | 1.5 | 0.5 | 0.1 | 1200 |
| 84 | 1 | 0.020 | 0.010 | 0.010 | 0.980 | 32 | 1.5 | 0.5 | 0.1 | 1200 |
| 85 | 1 | 0.020 | 0.010 | 0.010 | 0.980 | 50 | 1.5 | 0.5 | 0.1 | 1200 |
| 86 | 1 | 0.020 | 0.000 | 0.010 | 0.980 | 8.5 | 1.5 | 0.5 | 0.1 | 1200 |
| 87 | 1 | 0.020 | 0.001 | 0.010 | 0.980 | 8.5 | 1.5 | 0.5 | 0.1 | 1200 |
| 88 | 1 | 0.020 | 0.002 | 0.010 | 0.980 | 8.5 | 1.5 | 0.5 | 0.1 | 1200 |

TABLE 3-continued

| | Composition | | | | | | | | Average Particle Size of Calsined Powder μm | Sintering Temperature ° C. |
|---|---|---|---|---|---|---|---|---|---|---|
| | Molar ratios with respect to Ba | | | | | Ratios with respect to 100 parts by mass of Barium | | | | |
| Sample No. | Ba | Mg | Y | Mn | Ti | Nb$_2$O$_5$ parts by mass | SiO$_2$ parts by mass | B$_2$O$_3$ parts by mass | | |
| 89  | 1 | 0.020 | 0.005 | 0.010 | 0.980 | 8.5 | 1.5 | 0.5 | 0.1  | 1200 |
| 90  | 1 | 0.020 | 0.007 | 0.010 | 0.980 | 8.5 | 1.5 | 0.5 | 0.1  | 1200 |
| 91  | 1 | 0.020 | 0.030 | 0.010 | 0.980 | 8.5 | 1.5 | 0.5 | 0.1  | 1200 |
| 92  | 1 | 0.020 | 0.040 | 0.010 | 0.980 | 8.5 | 1.5 | 0.5 | 0.1  | 1200 |
| 93  | 1 | 0.005 | 0.010 | 0.010 | 0.980 | 8.5 | 1.5 | 0.5 | 0.1  | 1200 |
| 94  | 1 | 0.010 | 0.010 | 0.010 | 0.980 | 8.5 | 1.5 | 0.5 | 0.1  | 1200 |
| 95  | 1 | 0.017 | 0.010 | 0.010 | 0.980 | 8.5 | 1.5 | 0.5 | 0.1  | 1200 |
| 96  | 1 | 0.023 | 0.010 | 0.010 | 0.980 | 8.5 | 1.5 | 0.5 | 0.1  | 1200 |
| 97  | 1 | 0.040 | 0.010 | 0.010 | 0.980 | 8.5 | 1.5 | 0.5 | 0.1  | 1200 |
| 98  | 1 | 0.060 | 0.010 | 0.010 | 0.980 | 8.5 | 1.5 | 0.5 | 0.1  | 1200 |
| 99  | 1 | 0.070 | 0.010 | 0.010 | 0.980 | 8.5 | 1.5 | 0.5 | 0.1  | 1200 |
| 100 | 1 | 0.020 | 0.010 | 0.000 | 0.980 | 8.5 | 1.5 | 0.5 | 0.1  | 1200 |
| 101 | 1 | 0.020 | 0.010 | 0.005 | 0.980 | 8.5 | 1.5 | 0.5 | 0.1  | 1200 |
| 102 | 1 | 0.020 | 0.010 | 0.008 | 0.980 | 8.5 | 1.5 | 0.5 | 0.1  | 1200 |
| 103 | 1 | 0.020 | 0.010 | 0.013 | 0.980 | 8.5 | 1.5 | 0.5 | 0.1  | 1200 |
| 104 | 1 | 0.020 | 0.010 | 0.015 | 0.980 | 8.5 | 1.5 | 0.5 | 0.1  | 1200 |
| 105 | 1 | 0.020 | 0.010 | 0.030 | 0.980 | 8.5 | 1.5 | 0.5 | 0.1  | 1200 |
| 106 | 1 | 0.020 | 0.010 | 0.040 | 0.980 | 8.5 | 1.5 | 0.5 | 0.1  | 1200 |
| 107 | 1 | 0.020 | 0.010 | 0.010 | 0.970 | 8.5 | 1.5 | 0.5 | 0.1  | 1200 |
| 108 | 1 | 0.020 | 0.010 | 0.010 | 0.990 | 8.5 | 1.5 | 0.5 | 0.1  | 1200 |
| 109 | 1 | 0.020 | 0.010 | 0.000 | 0.980 | 8.5 | 1.5 | 0.5 | 0.1  | 1200 |
| 110 | 1 | 0.020 | 0.010 | 0.010 | 0.980 | 8.5 | 0.7 | 0.3 | 0.1  | 1250 |
| 111 | 1 | 0.020 | 0.010 | 0.010 | 0.980 | 8.5 | 2.5 | 0.5 | 0.1  | 1170 |
| 112 | 1 | 0.020 | 0.010 | 0.010 | 0.980 | 8.5 | 3   | 1   | 0.1  | 1150 |
| 113 | 1 | 0.020 | 0.010 | 0.010 | 0.980 | 8.5 | 4.5 | 1.5 | 0.1  | 1150 |
| 114 | 1 | 0.020 | 0.010 | 0.010 | 0.980 | 8.5 | 6   | 2   | 0.1  | 1100 |
| 115 | 1 | 0.020 | 0.030 | 0.010 | 0.980 | 8.5 | 1.5 | 0.5 | 0.04 | 1200 |
| 116 | 1 | 0.020 | 0.030 | 0.010 | 0.980 | 8.5 | 1.5 | 0.5 | 0.04 | 1160 |
| 117 | 1 | 0.020 | 0.010 | 0.010 | 0.980 | 8.5 | 0.5 | 2   | 0.1  | 1170 |

Next, an indium-gallium conductor paste was applied, to form a conductive layer, on the surface of the sintered sample. The samples were used for evaluation. Tables 4 to 6 show the results.

The relative dielectric constant can be measured, without limitation, in the following processes. The electrostatic capacity of each of samples of dielectric ceramics thus produced was measured by using an LCR meter 4284A (made by Hewlette Packard Development Comapany, L.P.) under conditions of a frequency of 1.0 kHz and an input signal level of 1.0V at temperatures of 25° C. and 125° C. Then, the relative dielectric constants at 25° C. and 125° C. were calculated based upon the diameter and thickness of the sample and the area of the conductor layer formed on the surface of the dielectric ceramic.

Moreover, the temperature coefficient of the relative dielectric constant was calculated by substituting each of the relative dielectric constants at 25° C. and 125° C. for the following expression:

$$TC = (\epsilon_{125} - \epsilon_{25}) / \{\epsilon_{25} * (125 - 25)\}$$

where $\epsilon_{25}$ and $\epsilon_{125}$ are relative dielectric constants at 25° C. and 125° C., respectively. These measurements were carried out by setting the number of samples to 10 and calculating the average value thereof.

Then, electrically induced strain was measured by a dielectric polarization (polarization charge) measurement for the resultant samples. In this case, the evaluation was made based upon the quantity of charge (residual polarization) at 0V when the voltage is changed within a range of ±1250V.

The compositions of the obtained dielectric ceramics were determined by using Inductively Coupled Plasma (ICP) emission spectroscopy and atomic absorption spectroscopy. Specifically, a mixture of each resultant dielectric ceramic, boric acid and sodium carbonate was melted and dissolved in hydrochloric acid, and the resultant solution was qualitatively analyzed by atomic absorption spectroscopy for elements contained in the dielectric ceramic. Then, the identified elements were quantified by ICP emission spectroscopy with standard samples obtained by diluting standard solutions of the elements. The oxygen content was measured with the assumption that the elements had valences shown in the periodic table.

The compositions of powder mixture are shown in Table 1 to 3. The average particle sizes of the calcined powders and the sintering temperatures for the calcined powders are also shown in Table 1 to 3. The average grain diameters and of the characteristics (relative dielectric constant, the absolute value of temperature coefficient of relative dielectric constant, temperature change curve in relative dielectric constant and polarized charge) are shown in Tables 4 to 6.

Here, the amounts of Nb$_2$O$_5$ additive in Tables 1 to 3 corresponds to a mass ratio with respect to 100 parts by mass of calcined powder while the mass ratio of Nb$_2$O$_5$ in Tables 4 to 6 correspond to a mass ratio relative to 100 parts by mass of barium titanate in the dielectric ceramic (sample). The amounts of Mg, Y and Mn in Table 4 to 6 correspond to converted amounts based on oxide. That is, they are indicated by the molar ratios of MgO, Y$_2$O$_3$ and MnO respectively. Here, "average grain size of crystal grains" in Table 4 to 6 refers to the average grain size of crystal grains containing barium titanate as a main component. Moreover, "the absolute value of temperature coefficient of relative dielectric constant" in Table 4 to 6 refers to the absolute value of the average value of the temperature coefficients in relative dielectric constant measured as described above. In the column of a curved line of temperature changes of relative dielectric constant in Table 4 to 6, those with no ○ put thereon represent those samples in which two peaks were not found centered on 25° C., while in the column of a polarization charge in Table 4 to 6, those with no ○ put thereon represent those samples whose polarization charge is not 20 nC/cm² or less.

TABLE 4

| Sample No. | Composition Molar ratios with respect to Ba | | | | | Nb₂O₅ parts by mass | Average Crystal Grain Size μm | Relative Dielectric Constant ($\epsilon_r$) | | Absolute Value of Temperature Coefficient of $\epsilon_r$ | Temperature Dependence Curve of $\epsilon_r$ | Polarized Charge |
|---|---|---|---|---|---|---|---|---|---|---|---|---|
| | Ba | MgO | Y₂O₃ | MnO | Ti | | | 25° C. | 125° C. | 25 to 125° C. ×10⁻⁶/° C. | ○: Two Peaks observed | ○: 20 nC/cm² or under |
| 1 | 1 | 0.02 | 0.01 | 0.01 | 0.98 | 2.1 | 0.4 | 4020 | 1330 | 6692 | — | — |
| 2 | 1 | 0.02 | 0.01 | 0.01 | 0.98 | 4.4 | 0.2 | 820 | 750 | 854 | ○ | — |
| 3 | 1 | 0.02 | 0.01 | 0.01 | 0.98 | 6.6 | 0.18 | 500 | 490 | 200 | ○ | ○ |
| 4 | 1 | 0.02 | 0.01 | 0.01 | 0.98 | 8.9 | 0.17 | 450 | 442 | 178 | ○ | ○ |
| 5 | 1 | 0.02 | 0.01 | 0.01 | 0.98 | 15.6 | 0.15 | 400 | 385 | 375 | ○ | ○ |
| 6 | 1 | 0.02 | 0.01 | 0.01 | 0.98 | 19.3 | 0.15 | 290 | 272 | 621 | ○ | — |
| 7 | 1 | 0.02 | 0.01 | 0.01 | 0.98 | 33.3 | 0.15 | 252 | 231 | 833 | ○ | — |
| 8 | 1 | 0.02 | 0.01 | 0.01 | 0.98 | 52.1 | 0.15 | 190 | 172 | 947 | — | — |
| 9 | 1 | 0.02 | 0.0002 | 0.01 | 0.98 | 8.8 | 0.4 | 800 | 711 | 1113 | — | — |
| 10 | 1 | 0.02 | 0.0007 | 0.01 | 0.98 | 8.8 | 0.25 | 630 | 568 | 984 | — | — |
| 11 | 1 | 0.02 | 0.0015 | 0.01 | 0.98 | 8.8 | 0.2 | 480 | 435 | 938 | ○ | — |
| 12 | 1 | 0.02 | 0.005 | 0.01 | 0.98 | 8.8 | 0.17 | 475 | 430 | 295 | ○ | ○ |
| 13 | 1 | 0.02 | 0.007 | 0.01 | 0.98 | 8.8 | 0.17 | 470 | 455 | 319 | ○ | ○ |
| 14 | 1 | 0.02 | 0.03 | 0.01 | 0.98 | 9.0 | 0.1 | 420 | 438 | 429 | ○ | — |
| 15 | 1 | 0.02 | 0.04 | 0.01 | 0.98 | 9.1 | 0.2 | 260 | 125 | 5192 | — | — |
| 16 | 1 | 0.005 | 0.01 | 0.01 | 0.98 | 8.7 | 0.16 | 750 | 655 | 1267 | — | — |
| 17 | 1 | 0.01 | 0.01 | 0.01 | 0.98 | 8.8 | 0.15 | 470 | 440 | 638 | ○ | — |
| 18 | 1 | 0.017 | 0.01 | 0.01 | 0.98 | 8.8 | 0.15 | 465 | 451 | 301 | ○ | ○ |
| 19 | 1 | 0.023 | 0.01 | 0.01 | 0.98 | 8.9 | 0.15 | 460 | 432 | 400 | ○ | ○ |
| 20 | 1 | 0.06 | 0.01 | 0.01 | 0.98 | 9.2 | 0.14 | 420 | 412 | 190 | ○ | ○ |
| 21 | 1 | 0.07 | 0.01 | 0.01 | 0.98 | 9.3 | 0.2 | 280 | 150 | 4643 | — | — |
| 22 | 1 | 0.02 | 0.01 | 0.0002 | 0.98 | 8.8 | 0.19 | 487 | 450 | 760 | ○ | — |
| 23 | 1 | 0.02 | 0.01 | 0.005 | 0.98 | 8.8 | 0.18 | 475 | 441 | 716 | ○ | — |
| 24 | 1 | 0.02 | 0.01 | 0.008 | 0.98 | 8.8 | 0.18 | 470 | 440 | 638 | ○ | — |
| 25 | 1 | 0.02 | 0.01 | 0.015 | 0.98 | 8.9 | 0.18 | 438 | 430 | 183 | ○ | ○ |
| 26 | 1 | 0.02 | 0.01 | 0.03 | 0.98 | 9.0 | 0.16 | 434 | 430 | 92 | ○ | ○ |
| 27 | 1 | 0.02 | 0.01 | 0.04 | 0.98 | 9.1 | 0.14 | 285 | 254 | 1088 | — | — |
| 28 | 1 | 0.02 | 0.01 | 0.01 | 0.97 | 8.9 | 0.14 | 450 | 436 | 311 | ○ | ○ |
| 29 | 1 | 0.02 | 0.01 | 0.01 | 0.99 | 8.9 | 0.15 | 439 | 420 | 433 | ○ | — |
| 30 | 1 | 0.02 | 0.01 | 0 | 0.98 | 8.8 | 0.4 | 510 | 454 | 1098 | — | — |
| 31 | 1 | 0.02 | 0.03 | 0.01 | 0.98 | 9.0 | 0.05 | 253 | 242 | 435 | ○ | — |
| 32 | 1 | 0.02 | 0.03 | 0.01 | 0.98 | 9.0 | 0.04 | 189 | 181 | 423 | — | — |
| 33 | 1 | 0.02 | 0.01 | 0.01 | 0.98 | 4.2 | 0.27 | 1420 | 1270 | 1056 | — | — |
| 34 | 1 | 0.02 | 0.01 | 0.01 | 0.98 | 8.9 | 0.16 | 444 | 432 | 270 | ○ | ○ |
| 35 | 1 | 0.02 | 0.01 | 0.01 | 0.98 | 8.9 | 0.18 | 410 | 398 | 293 | ○ | ○ |

TABLE 5

| Sample No. | Composition Molar ratios with respect to Ba | | | | | Ratios with respect to 100 parts by mass of BaTiO₃ | | | Average Crystal Grain Size μm | Relative Dielectric Constant ($\epsilon_r$) | | Absolute Value of Temperature Coefficient of $\epsilon_r$ | Temperature Dependence Curve of $\epsilon_r$ | Polarized Charge |
|---|---|---|---|---|---|---|---|---|---|---|---|---|---|---|
| | Ba | MgO | Y₂O₃ | MnO | Ti | Nb₂O₅ | SiO₂ | B₂O₃ | | 25° C. | 125° C. | 25 to 125° C. ×10⁻⁶/° C. | ○: Two Peaks observed | ○: 20 nC/cm² or under |
| | | | | | | parts by mass | | | | | | | | |
| 36 | 1 | 0.020 | 0.010 | 0.010 | 0.980 | 2.1 | 1.56 | 0.52 | 0.40 | 4000 | 1323 | 6692 | — | — |
| 37 | 1 | 0.020 | 0.010 | 0.010 | 0.980 | 3.6 | 1.56 | 0.52 | 0.22 | 1430 | 1120 | 2168 | — | — |
| 38 | 1 | 0.020 | 0.010 | 0.010 | 0.980 | 4.2 | 1.56 | 0.52 | 0.20 | 816 | 746 | 854 | ○ | — |
| 39 | 1 | 0.020 | 0.010 | 0.010 | 0.980 | 6.3 | 1.56 | 0.52 | 0.18 | 498 | 488 | 200 | ○ | ○ |
| 40 | 1 | 0.020 | 0.010 | 0.010 | 0.980 | 8.9 | 1.56 | 0.52 | 0.17 | 448 | 440 | 178 | ○ | ○ |
| 41 | 1 | 0.020 | 0.010 | 0.010 | 0.980 | 15.6 | 1.56 | 0.52 | 0.15 | 402 | 387 | 375 | ○ | ○ |
| 42 | 1 | 0.020 | 0.010 | 0.010 | 0.980 | 19.3 | 1.56 | 0.52 | 0.15 | 289 | 271 | 621 | ○ | — |
| 43 | 1 | 0.020 | 0.010 | 0.010 | 0.980 | 33.3 | 1.56 | 0.52 | 0.15 | 251 | 232 | 741 | ○ | — |
| 44 | 1 | 0.020 | 0.010 | 0.010 | 0.980 | 52.1 | 1.56 | 0.52 | 0.15 | 189 | 171 | 947 | ○ | — |
| 45 | 1 | 0.020 | 0.000 | 0.010 | 0.980 | 8.8 | 1.55 | 0.52 | 0.40 | 796 | 707 | 1121 | — | — |
| 46 | 1 | 0.020 | 0.001 | 0.010 | 0.980 | 8.8 | 1.55 | 0.52 | 0.25 | 640 | 605 | 547 | ○ | — |
| 47 | 1 | 0.020 | 0.002 | 0.010 | 0.980 | 8.8 | 1.55 | 0.52 | 0.20 | 478 | 459 | 391 | ○ | ○ |
| 48 | 1 | 0.020 | 0.005 | 0.010 | 0.980 | 8.8 | 1.55 | 0.52 | 0.17 | 473 | 456 | 356 | ○ | ○ |
| 49 | 1 | 0.020 | 0.007 | 0.010 | 0.980 | 8.8 | 1.56 | 0.52 | 0.17 | 468 | 482 | 313 | ○ | ○ |

TABLE 5-continued

| | | | | | | Ratios with respect to 100 parts by mass of BaTiO₃ | | | Avarage Crystal Grain | Relative Dielectric Constant ($\epsilon_r$) | | Abusolute Value of Temperature Coefficient of $\epsilon_r$ | Temperature Dependence Curve of $\epsilon_r$ | Poralized Charge |
|---|---|---|---|---|---|---|---|---|---|---|---|---|---|---|
| Sample No. | \multicolumn{5}{c}{Molar ratios with respect to Ba} | Nb₂O₅ | SiO₂ | B₂O₃ | Size | 25° C. | 125° C. | 25 to 125° C. | ○: Two Peaks observed | ○: 20 nC/cm² or under |
| | Ba | MgO | Y₂O₃ | MnO | Ti | \multicolumn{3}{c}{parts by mass} | μm | — | — | ×10⁻⁶/° C. | | |
| 50 | 1 | 0.020 | 0.030 | 0.010 | 0.980 | 9.0 | 1.60 | 0.53 | 0.12 | 418 | 436 | 429 | ○ | — |
| 51 | 1 | 0.020 | 0.040 | 0.010 | 0.980 | 9.1 | 1.61 | 0.54 | 0.18 | 259 | 138 | 4685 | — | — |
| 52 | 1 | 0.005 | 0.010 | 0.010 | 0.980 | 8.7 | 1.54 | 0.51 | 0.16 | 746 | 652 | 1267 | — | — |
| 53 | 1 | 0.010 | 0.010 | 0.010 | 0.980 | 8.8 | 1.55 | 0.52 | 0.15 | 468 | 444 | 497 | ○ | — |
| 54 | 1 | 0.017 | 0.010 | 0.010 | 0.980 | 8.8 | 1.56 | 0.52 | 0.15 | 463 | 445 | 389 | ○ | ○ |
| 55 | 1 | 0.023 | 0.010 | 0.010 | 0.980 | 8.9 | 1.57 | 0.52 | 0.15 | 458 | 441 | 373 | ○ | ○ |
| 56 | 1 | 0.040 | 0.010 | 0.010 | 0.980 | 9.0 | 1.60 | 0.53 | 0.15 | 438 | 422 | 361 | ○ | ○ |
| 57 | 1 | 0.060 | 0.010 | 0.010 | 0.980 | 9.2 | 1.63 | 0.54 | 0.15 | 418 | 404 | 338 | ○ | ○ |
| 58 | 1 | 0.070 | 0.010 | 0.010 | 0.980 | 9.3 | 1.65 | 0.55 | 0.19 | 279 | 149 | 4670 | — | — |
| 59 | 1 | 0.020 | 0.010 | 0.0002 | 0.980 | 8.8 | 1.55 | 0.52 | 0.19 | 485 | 448 | 760 | ○ | — |
| 60 | 1 | 0.020 | 0.010 | 0.005 | 0.980 | 8.8 | 1.55 | 0.52 | 0.18 | 473 | 439 | 716 | ○ | — |
| 61 | 1 | 0.020 | 0.010 | 0.008 | 0.980 | 8.8 | 1.56 | 0.52 | 0.18 | 468 | 438 | 638 | ○ | — |
| 62 | 1 | 0.020 | 0.010 | 0.013 | 0.980 | 8.9 | 1.57 | 0.52 | 0.18 | 447 | 430 | 380 | ○ | ○ |
| 63 | 1 | 0.020 | 0.010 | 0.015 | 0.980 | 8.9 | 1.57 | 0.52 | 0.18 | 436 | 421 | 350 | ○ | ○ |
| 64 | 1 | 0.020 | 0.010 | 0.030 | 0.980 | 9.0 | 1.60 | 0.53 | 0.16 | 432 | 417 | 341 | ○ | ○ |
| 65 | 1 | 0.020 | 0.010 | 0.040 | 0.980 | 9.1 | 1.61 | 0.54 | 0.14 | 284 | 251 | 1133 | ○ | — |
| 66 | 1 | 0.020 | 0.010 | 0.010 | 0.970 | 8.9 | 1.56 | 0.52 | 0.14 | 448 | 432 | 360 | ○ | ○ |
| 67 | 1 | 0.020 | 0.010 | 0.010 | 0.990 | 8.9 | 1.56 | 0.52 | 0.15 | 437 | 416 | 481 | ○ | — |
| 68 | 1 | 0.020 | 0.010 | 0 | 0.980 | 8.8 | 1.55 | 0.52 | 0.40 | 507 | 456 | 1009 | ○ | — |
| 69 | 1 | 0.020 | 0.010 | 0.010 | 0.980 | 8.9 | 0.73 | 0.31 | 0.15 | 525 | 515 | 193 | ○ | ○ |
| 70 | 1 | 0.020 | 0.010 | 0.010 | 0.980 | 8.9 | 2.61 | 0.52 | 0.15 | 440 | 426 | 314 | ○ | ○ |
| 71 | 1 | 0.020 | 0.010 | 0.010 | 0.980 | 8.9 | 3.13 | 1.04 | 0.15 | 402 | 387 | 371 | ○ | ○ |
| 72 | 1 | 0.020 | 0.010 | 0.010 | 0.980 | 8.9 | 4.69 | 1.56 | 0.15 | 287 | 276 | 384 | ○ | — |
| 73 | 1 | 0.020 | 0.010 | 0.010 | 0.980 | 8.9 | 6.25 | 2.08 | 0.15 | 253 | 242 | 436 | ○ | — |
| 74 | 1 | 0.020 | 0.030 | 0.010 | 0.980 | 9.0 | 1.60 | 0.53 | 0.05 | 253 | 236 | 662 | ○ | — |
| 75 | 1 | 0.020 | 0.030 | 0.010 | 0.980 | 9.0 | 1.60 | 0.53 | 0.04 | 170 | 157 | 773 | ○ | — |
| 76 | 1 | 0.020 | 0.010 | 0.010 | 0.980 | 8.9 | 1.56 | 0.52 | 0.30 | 1628 | 1115 | 3150 | ○ | — |

TABLE 6

| | | | | | | Ratios with respect to 100 parts by mass of BaTiO₃ | | | Avarage Crystal Grain | Relative Dielectric Constant (εr) | | Abusolute Valure of Temperature Coefficient of εr | Temperature Dependence Curve of εr | Poralized Charge |
|---|---|---|---|---|---|---|---|---|---|---|---|---|---|---|
| Sample No. | \multicolumn{5}{c}{Molar ratios with respect to Ba} | Nb₂O₅ | SiO₂ | B₂O₃ | Size | 25° C. | 125° C. | 25 to 125° C. | ○: Two Peaks observed | ○: 20 nC/cm² or less |
| | Ba | MgO | Y₂O₃ | MnO | Ti | \multicolumn{3}{c}{parts by mass} | μm | — | — | ×10⁻⁶/° C. | | |
| 77 | 1 | 0.020 | 0.010 | 0.010 | 0.980 | 2.1 | 1.56 | 0.52 | 0.4 | 4040 | 1333 | 6701 | — | — |
| 78 | 1 | 0.020 | 0.010 | 0.010 | 0.980 | 3.6 | 1.56 | 0.52 | 0.23 | 1425 | 1105 | 2246 | — | — |
| 79 | 1 | 0.020 | 0.010 | 0.010 | 0.980 | 4.2 | 1.56 | 0.52 | 0.2 | 824 | 751 | 890 | ○ | ○ |
| 80 | 1 | 0.020 | 0.010 | 0.010 | 0.980 | 6.3 | 1.56 | 0.52 | 0.18 | 503 | 490 | 239 | ○ | ○ |
| 81 | 1 | 0.020 | 0.010 | 0.010 | 0.980 | 8.9 | 1.56 | 0.52 | 0.17 | 452 | 442 | 217 | ○ | ○ |
| 82 | 1 | 0.020 | 0.010 | 0.010 | 0.980 | 15.6 | 1.56 | 0.52 | 0.15 | 402 | 386 | 394 | ○ | ○ |
| 83 | 1 | 0.020 | 0.010 | 0.010 | 0.980 | 19.3 | 1.56 | 0.52 | 0.15 | 291 | 272 | 658 | ○ | — |
| 84 | 1 | 0.020 | 0.010 | 0.010 | 0.980 | 33.3 | 1.56 | 0.52 | 0.15 | 253 | 231 | 870 | ○ | — |
| 85 | 1 | 0.020 | 0.010 | 0.010 | 0.980 | 52.1 | 1.56 | 0.52 | 0.15 | 191 | 172 | 983 | ○ | — |
| 86 | 1 | 0.020 | 0.0002 | 0.010 | 0.980 | 8.8 | 1.55 | 0.52 | 0.4 | 804 | 715 | 1113 | — | — |
| 87 | 1 | 0.020 | 0.0007 | 0.010 | 0.980 | 8.8 | 1.55 | 0.52 | 0.24 | 660 | 613 | 712 | ○ | — |
| 88 | 1 | 0.020 | 0.0015 | 0.010 | 0.980 | 8.8 | 1.55 | 0.52 | 0.2 | 482 | 463 | 396 | ○ | ○ |
| 89 | 1 | 0.020 | 0.005 | 0.010 | 0.980 | 8.8 | 1.55 | 0.52 | 0.17 | 477 | 480 | 362 | ○ | ○ |
| 90 | 1 | 0.020 | 0.007 | 0.010 | 0.980 | 8.8 | 1.56 | 0.52 | 0.17 | 472 | 487 | 307 | ○ | ○ |
| 91 | 1 | 0.020 | 0.030 | 0.010 | 0.980 | 9.0 | 1.60 | 0.53 | 0.12 | 422 | 442 | 480 | ○ | — |
| 92 | 1 | 0.020 | 0.040 | 0.010 | 0.980 | 9.1 | 1.61 | 0.54 | 0.17 | 261 | 138 | 4738 | — | — |
| 93 | 1 | 0.005 | 0.010 | 0.010 | 0.980 | 8.7 | 1.54 | 0.51 | 0.16 | 754 | 655 | 1310 | — | — |
| 94 | 1 | 0.010 | 0.010 | 0.010 | 0.980 | 8.8 | 1.55 | 0.52 | 0.15 | 472 | 449 | 499 | ○ | — |
| 95 | 1 | 0.017 | 0.010 | 0.010 | 0.980 | 8.8 | 1.56 | 0.52 | 0.15 | 467 | 449 | 398 | ○ | ○ |
| 96 | 1 | 0.023 | 0.010 | 0.010 | 0.980 | 8.9 | 1.57 | 0.52 | 0.15 | 462 | 445 | 375 | ○ | ○ |
| 97 | 1 | 0.040 | 0.010 | 0.010 | 0.980 | 9.0 | 1.60 | 0.53 | 0.15 | 438 | 426 | 265 | ○ | ○ |
| 98 | 1 | 0.060 | 0.010 | 0.010 | 0.980 | 9.2 | 1.63 | 0.54 | 0.15 | 418 | 408 | 240 | ○ | ○ |
| 99 | 1 | 0.070 | 0.010 | 0.010 | 0.980 | 9.3 | 1.65 | 0.55 | 0.19 | 281 | 152 | 4616 | — | — |
| 100 | 1 | 0.020 | 0.010 | 0.0002 | 0.980 | 8.8 | 1.55 | 0.52 | 0.19 | 489 | 452 | 760 | ○ | — |
| 101 | 1 | 0.020 | 0.010 | 0.005 | 0.980 | 8.8 | 1.55 | 0.52 | 0.18 | 477 | 444 | 697 | ○ | — |
| 102 | 1 | 0.020 | 0.010 | 0.008 | 0.980 | 8.8 | 1.56 | 0.52 | 0.18 | 472 | 441 | 657 | ○ | — |

TABLE 6-continued

| | Composition | | | | | | | | Average Crystal Grain Size | Relative Dielectric Constant (εr) | | Absolute Value of Temperature Coefficient of εr | Temperature Dependence Curve of εr | Poralized Charge |
|---|---|---|---|---|---|---|---|---|---|---|---|---|---|---|
| | | | | | | Ratios with respect to 100 parts by mass of BaTiO₃ | | | | | | | | |
| Sample No. | Molar ratios with respect to Ba | | | | | Nb₂O₅ | SiO₂ | B₂O₃ | | 25° C. | 125° C. | 25 to 125° C. | ○: Two Peaks observed | ○: 20 nC/cm² or less |
| | Ba | MgO | Y₂O₃ | MnO | Ti | parts by mass | | | μm | — | — | ×10⁻⁶/° C. | | |
| 103 | 1 | 0.020 | 0.010 | 0.013 | 0.980 | 8.9 | 1.57 | 0.52 | 0.18 | 450 | 433 | 378 | ○ | ○ |
| 104 | 1 | 0.020 | 0.010 | 0.015 | 0.980 | 8.9 | 1.57 | 0.52 | 0.18 | 440 | 426 | 329 | ○ | ○ |
| 105 | 1 | 0.020 | 0.010 | 0.030 | 0.980 | 9.0 | 1.60 | 0.53 | 0.16 | 436 | 424 | 289 | ○ | ○ |
| 106 | 1 | 0.020 | 0.010 | 0.040 | 0.980 | 9.1 | 1.61 | 0.54 | 0.14 | 286 | 257 | 1043 | — | — |
| 107 | 1 | 0.020 | 0.010 | 0.010 | 0.970 | 8.9 | 1.56 | 0.52 | 0.14 | 452 | 436 | 359 | ○ | ○ |
| 108 | 1 | 0.020 | 0.010 | 0.010 | 0.990 | 8.9 | 1.56 | 0.62 | 0.15 | 441 | 421 | 461 | ○ | — |
| 109 | 1 | 0.020 | 0.010 | 0 | 0.980 | 8.8 | 1.55 | 0.52 | 0.4 | 513 | 456 | 1098 | — | — |
| 110 | 1 | 0.020 | 0.010 | 0.010 | 0.980 | 8.9 | 0.73 | 0.31 | 0.15 | 531 | 517 | 249 | ○ | ○ |
| 111 | 1 | 0.020 | 0.010 | 0.010 | 0.980 | 8.9 | 2.61 | 0.52 | 0.15 | 445 | 429 | 362 | ○ | ○ |
| 112 | 1 | 0.020 | 0.010 | 0.010 | 0.980 | 8.9 | 3.13 | 1.04 | 0.15 | 402 | 386 | 390 | ○ | ○ |
| 113 | 1 | 0.020 | 0.010 | 0.010 | 0.980 | 8.9 | 4.69 | 1.56 | 0.15 | 289 | 277 | 432 | ○ | — |
| 114 | 1 | 0.020 | 0.010 | 0.010 | 0.980 | 8.9 | 6.3 | 2.1 | 0.15 | 253 | 238 | 595 | ○ | — |
| 115 | 1 | 0.020 | 0.030 | 0.010 | 0.980 | 9.0 | 1.60 | 0.53 | 0.05 | 255 | 237 | 709 | ○ | — |
| 116 | 1 | 0.020 | 0.030 | 0.010 | 0.980 | 9.0 | 1.60 | 0.53 | 0.04 | 172 | 158 | 819 | ○ | — |
| 117 | 1 | 0.020 | 0.010 | 0.010 | 0.980 | 8.9 | 1.56 | 0.52 | 0.28 | 1644 | 1121 | 3185 | — | — |

Table 1 and 4 indicates that in samples of Nos. 2 to 7, 10, 11 to 14, 17 to 20, 22 to 26, 28, 29, 31, 34 and 35, the relative dielectric constant at 25° C. is 250 or more, the relative dielectric constant at 125° C. is 230 or more, and the temperature coefficient in relative dielectric constant in a temperature range from 25° C. to 125° C. is $1000 \times 10^{-6}/°$ C. or less as the absolute value.

In particular, samples of Nos. 3 to 5, 12, 13, 18 to 20, 25, 26, 28, 34 and 35 include 0.017 to 0.06 of the molar ratio of MgO with respect to Ba, 0.005 to 0.01 of the molar ratio of $Y_2O_3$ with respect to Ba and 0.01 to 0.03 of the molar ratio of MnO with respect to Ba, and the content of $Nb_2O_5$ is 6.3 to 15.6 parts by mass with respect to 100 parts by mass of barium titanate as a main component. In these samples, the relative dielectric constant at 25° C. is 400 or more, the relative dielectric constant at 125° C. is 380 or more, the temperature coefficient in relative dielectric constant in a temperature range from 25° C. to 125° C. is $400 \times 10^{-6}/°$ C. or less as the absolute value, and the curve indicating the rate of change in relative dielectric constant had two peaks in a temperature range from −55° C. to 125° C. No large hysteresis was observed in the measurements of electric-field versus dielectric polarization characteristic. Those samples having no large hysteresis had a polarization charge of 20 nC/cm² or less at 0V.

Figure 2:
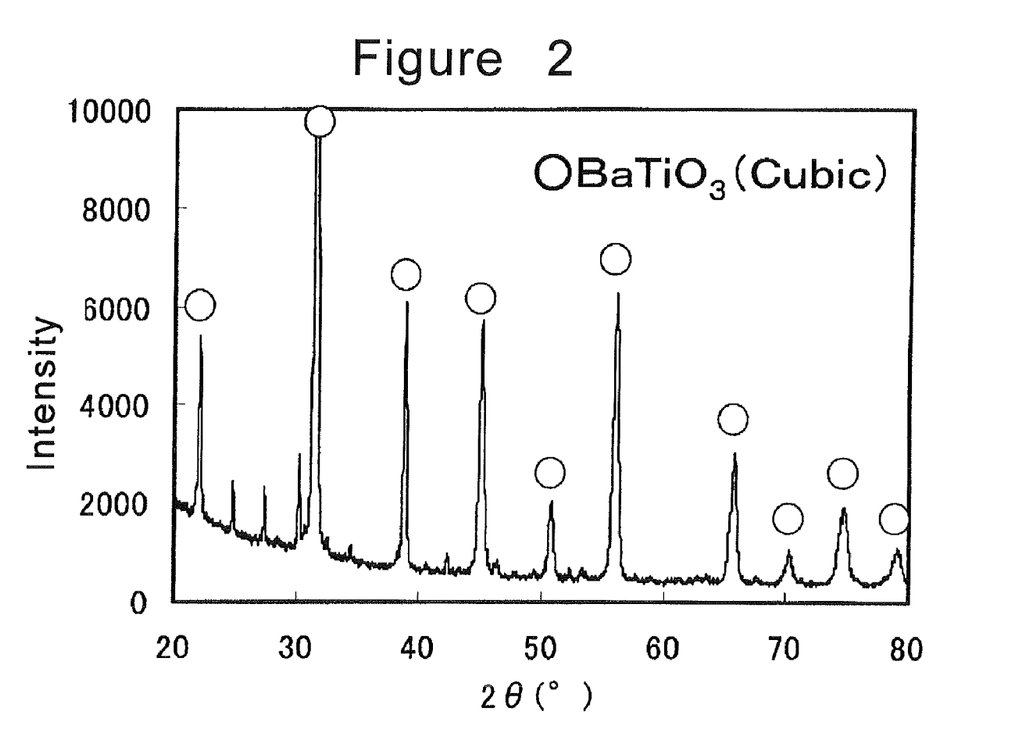
FIG. 2 is a graph showing an X-ray diffraction pattern of sample No. 1-4 in EXAMPLE 1.
Figure 3:
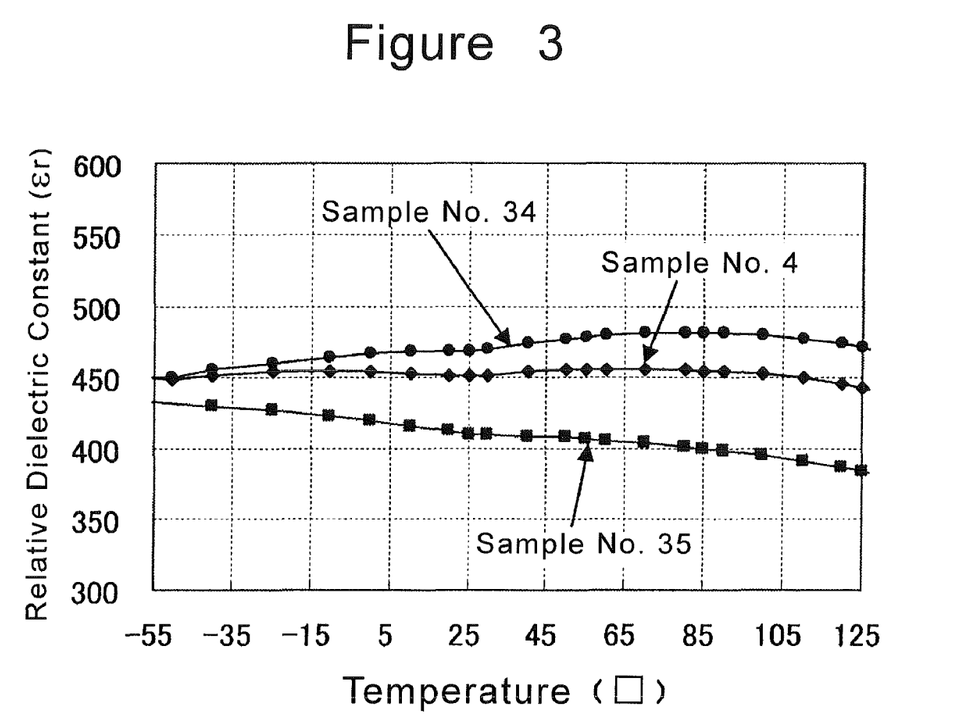
FIG. 3 is a graph showing a change in relative dielectric constants of Sample Nos. 1-4, 33 and 34 in the EXAMPLE 1.
Figure 4:
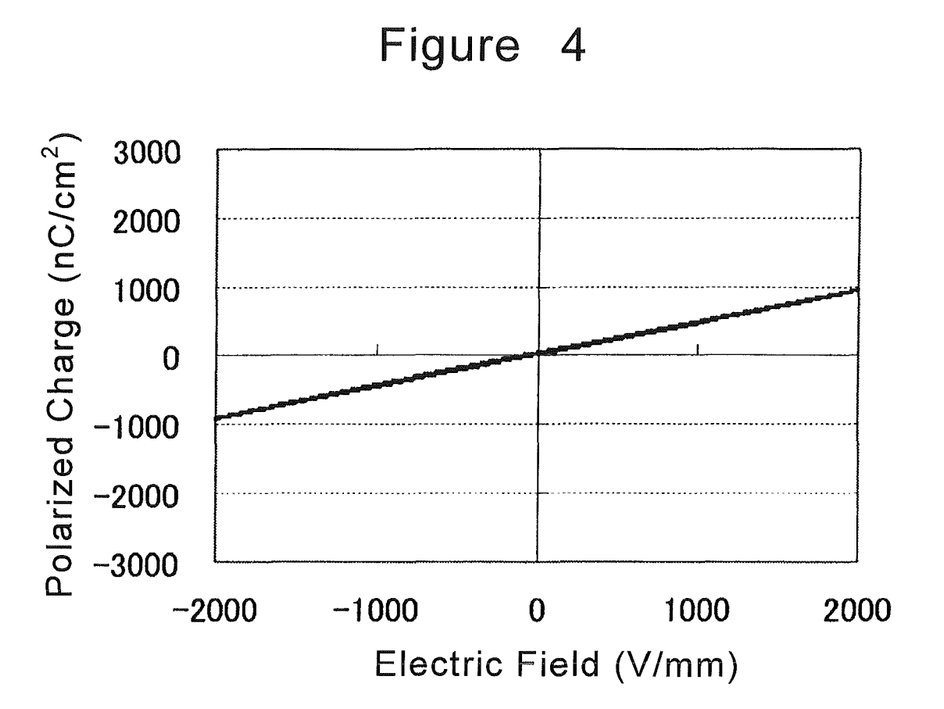
FIG. 4 is a graph showing a characteristic of dielectric polarization (V-Q) of Sample No. 1-4 in the EXAMPLE 1.

FIG. 2 shows an X-ray diffraction pattern of a dielectric ceramic derived from sample No. 4 which was arbitrarily selected from these samples. FIG. 3 shows the change in relative dielectric constant of the sample No. 4. FIG. 4 shows the electric-field versus dielectric polarization characteristic. In FIG. 3, those of samples Nos. 34 and 35 are also shown for comparison.

As shown in FIG. 2 to 4, the dielectric ceramic of sample No. 4 has the crystal structure mainly comprising a cubic system, the temperature characteristic in relative dielectric constant has two peaks centered on 25° C., the rate of change in relative dielectric constant was small, and the hysteresis in electric-field versus dielectric polarization characteristic was small. In the same manner, the other samples mentioned above had a crystal structure mainly comprising a cubic system and also had a small rate of change in relative dielectric constant.

In contrast, in samples Nos. 1, 8, 9, 15, 16, 21, 27, 30, 32 and 33, the relative dielectric constant at 25° C. was 200 or less, or there was a hysteresis in dielectric polarization with the result that the absolute value of the temperature coefficient in relative dielectric constant was greater than $1000 \times 10^{-6}/°$ C.

Table 2 and 5 indicates that in samples of Nos. 38 to 43, 46 to 50, 53 to 57, 59 to 64, 66, 67, 69 to 73 and 74, the relative dielectric constant at 25° C. is 250 or more, the relative dielectric constant at 125° C. is 230 or more, and the temperature coefficient in relative dielectric constant in a range from 25° C. to 125° C. is $1000 \times 10^{-6}/°$ C. or less as the absolute value.

In particular, samples of Nos. 39 to 41, 47 to 49, 54 to 57, 62 to 64, 66 and 69 to 71 include 0.017 to 0.06 mole of MgO, 0.005 to 0.01 mole of $Y_2O_3$ and 0.01 to 0.03 mole of MnO per 1 mole of Ba, and the content of $Nb_2O_5$ is 6.3 to 15.6 parts by mass, the content of $SiO_2$ is 0.73 to 3.13 parts by mass and the content of $B_2O_3$ is 0.31 to 1.04 parts by mass with respect to 100 parts by mass of barium titanate as a main component. In these samples, the relative dielectric constant at 25° C. is 400 or more, the relative dielectric constant at 125° C. is 380 or more, the temperature coefficient in relative dielectric constant in a temperature range from 25° C. to 125° C. is $400 \times 10^{-6}/°$ C. or less as the absolute value and the curve indicating the rate of change in relative dielectric constant had two peaks in a temperature range from −55° C. to 125° C. No large hysteresis was observed in the measurements of electric-field versus dielectric polarization characteristic for these samples. Those samples having no large hysteresis had a polarization charge of 20 nC/cm² or less at 0V.

Figure 5:
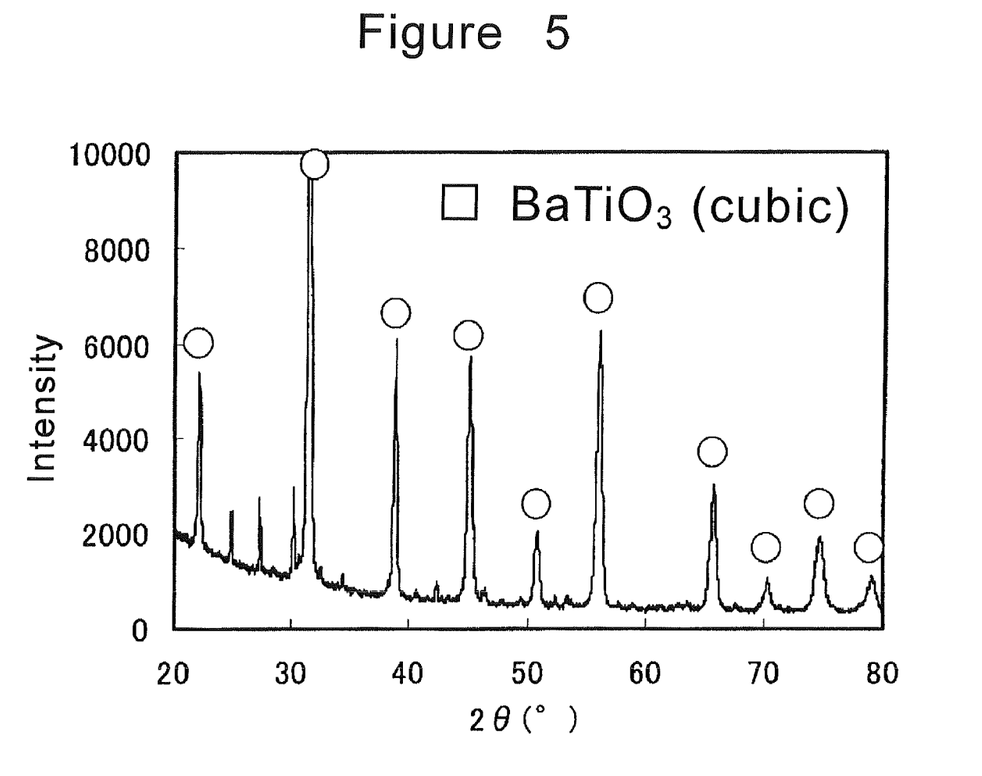
FIG. 5 is a graph showing an X-ray diffraction pattern of sample No. 2-4 in EXAMPLE 2.

FIG. 5 shows an X-ray diffraction pattern of a dielectric ceramic derived from sample No. 39 which was arbitrarily selected from these samples. As shown in FIG. 5, the dielectric ceramic of sample No. 39 has the crystal structure mainly comprising a cubic system.

In the same manner, the samples of Nos. 40, 41, 47 to 49, 54 to 57, 62 to 64, 66 and 69 to 71 had a crystal structure mainly comprising a cubic system.

Table 3 and 6 indicates that in samples of Nos. 79 to 84, 87 to 91, 94 to 98, 100 to 105, 107, 108, 110 to 114 and 115, the relative dielectric constant at 25° C. is 250 or more, the relative dielectric constant at 125° C. is 230 or more, and the temperature coefficient in relative dielectric constant in a temperature range from 25° C. to 125° C. is 1000×10⁻⁶/° C. or less as the absolute value.

In particular, samples of Nos. 80 to 82, 88 to 90, 95 to 98, 103 to 105, 107 and 110 to 112 include 0.017 to 0.06 mole of MgO, 0.0015 to 0.01 mole of $Y_2O_3$ and 0.01 to 0.03 mole of MnO per 1 mole of Ba, and the content of $Nb_2O_5$ is 6.3 to 15.6 parts by mass, the content of $SiO_2$ is 0.73 to 3.13 parts by mass and the content of $Li_2O$ is 0.31 to 1.04 parts by mass with respect to 100 parts by mass of barium titanate as a main component, and the titanium molar ratio over 1 mole of barium is 0.97 to 0.98. In these samples, the relative dielectric constant at 25° C. is 400 or more, the relative dielectric constant at 125° C. is 380 or more, the temperature coefficient in relative dielectric constant in a range from 25° C. to 125° C. is 400×10⁻⁶/° C. or less as the absolute value and the curve indicating the rate of change in relative dielectric constant had two peaks in a temperature range from −55° C. to 125° C. No large hysteresis was found in the measurements of electric-field versus dielectric polarization characteristic for these samples. Those samples having no hysteresis had a polarization charge of 20 nC/cm² or less at 0V.

Figure 6:
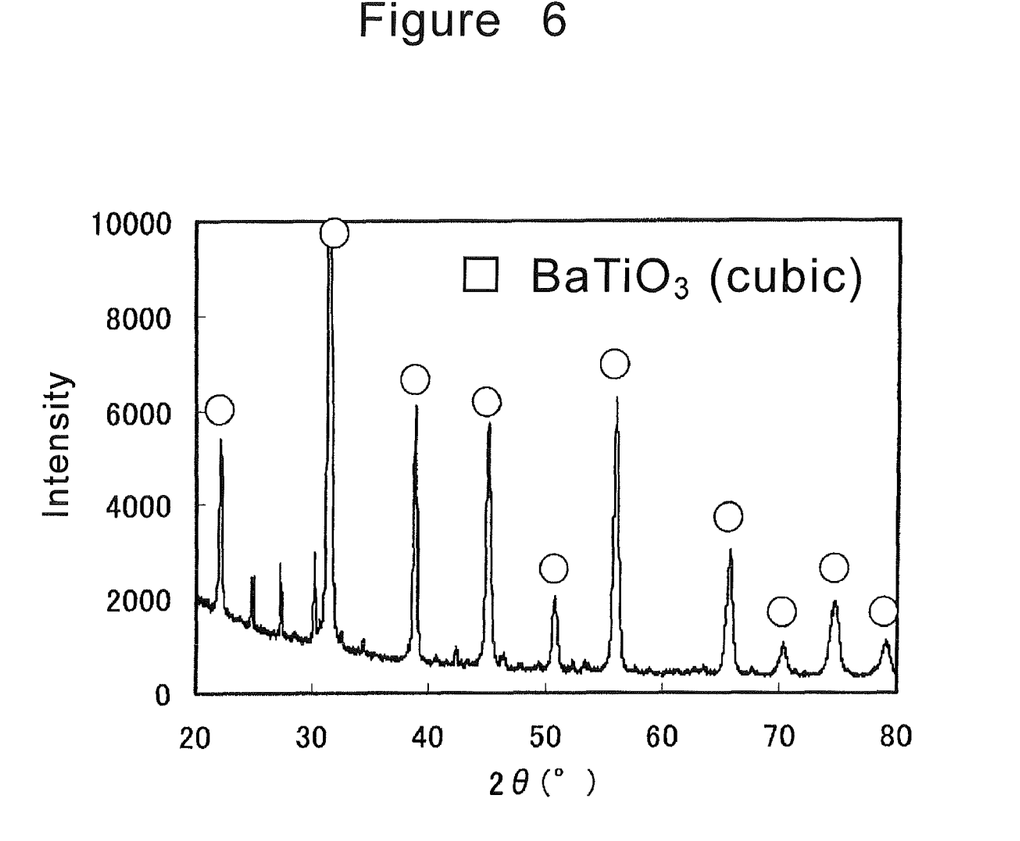
FIG. 6 is a graph showing an X-ray diffraction pattern of sample No. 3-4 in EXAMPLE 3.

FIG. 6 shows an X-ray diffraction pattern of a dielectric ceramic derived from sample No. 80 arbitrarily selected from these samples. As shown in FIG. 6, the dielectric ceramic of sample No. 80 has the crystal structure mainly comprising a cubic system.

In the same manner, the samples of Nos. 79, 81 to 84, 87 to 91, 94 to 98, 100 to 105, 107, 108, 110 to 114 and 115 had a crystal structure mainly comprising a cubic system.

Although exemplary embodiments of the present invention have been described above with reference to the accompanying drawings, it is understood that the present invention is not limited to the above-described embodiments. Various alterations and modifications to the above embodiments are contemplated to be within the scope of the invention. It should be understood that those alterations and modifications are included in the technical scope of the present invention as defined by the appended claims.

Terms and phrases used in this document, and variations hereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

While at least one exemplary embodiment has been presented in the foregoing detailed description, the present invention is not limited to the above-described embodiment or embodiments. Variations may be apparent to those skilled in the art. In carrying out the present disclosure, various modifications, combinations, sub-combinations and alterations may occur in regard to the elements of the above-described embodiment insofar as they are within the technical scope of the present disclosure or the equivalents thereof. The exemplary embodiment or exemplary embodiments are examples, and are not intended to limit the scope, applicability, or configuration of the disclosure in any way. Rather, the foregoing detailed description will provide those skilled in the art with a template for implementing the exemplary embodiment or exemplary embodiments. It should be understood that various changes can be made in the function and arrangement of elements without departing from the scope of the disclosure as set forth in the appended claims and the legal equivalents thereof. Furthermore, although embodiments of the present disclosure have been described with reference to the accompanying drawings, it is to be noted that changes and modifications may be apparent to those skilled in the art. Such changes and modifications are to be understood as being included within the scope of the present disclosure as defined by the claims.

The invention claimed is:

1. A dielectric ceramic, comprising crystal grains comprising barium titanate as a main component and grain boundaries locating between or among the crystal grains,
   wherein the dielectric ceramic contains magnesium, yttrium, manganese and niobium, wherein a molar ratio of magnesium to barium is 0.01 to 0.06, a molar ratio of yttrium to barium is 0.0014 to 0.06 and a molar ratio of manganese to barium is 0.0002 to 0.03,
   wherein the dielectric ceramic further contains niobium, wherein the mass ratio of niobium to barium titanate is equivalent to 4.2 to 33.3 parts by mass of $Nb_2O_5$ with respect to 100 parts by mass of barium titanate, and
   wherein an average diameter of the crystal grains is about 0.05 to about 0.25 μm.

2. The dielectric ceramic according to claim 1,
   wherein the molar ratio of magnesium is 0.017 to 0.06 with respect to barium, the molar ratio of yttrium is 0.010 to 0.02 with respect to barium and the molar ratio of manganese is 0.01 to 0.03 with respect to barium.

3. The dielectric ceramic according to claim 2,
   wherein the mass ratio of niobium to barium titanate is equivalent to 6.3 to 15.6 parts by mass of $Nb_2O_5$ with respect to 100 parts by mass of barium titanate.

4. The dielectric ceramic according to claim 3,
   wherein the molar ratio of titanium with respect to barium is 0.97 to 0.98.

5. The dielectric ceramic according to claim 4,
   wherein the dielectric ceramic further contains silicon and boron, wherein the mass ratio of silicon to barium titanate is equivalent to 0.73 to 3.13 parts by mass of $SiO_2$ with respect to 100 parts by mass of barium titanate, and the mass ratio of boron to barium titanate is equivalent to 0.31 to 1.04 parts by mass of $B_2O_3$ with respect to 100 parts by mass of barium titanate.

6. The dielectric ceramic according to claim 4,
   wherein the dielectric ceramic further contains silicon and lithium, wherein the mass ratio of silicon to barium titanate is equivalent to 0.73 to 3.13 parts by mass of SiO₂ with respect to 100 parts by mass of barium titanate, and the mass ratio of lithium to barium titanate is equivalent to 0.31 to 1.04 parts by mass of $Li_2O$ with respect to 100 parts by mass of barium titanate.

7. The dielectric ceramic according to claim 1,
wherein the dielectric ceramic further contains silicon and boron, wherein the mass ratio of silicon to barium titanate is equivalent to 0.73 to 6.3 parts by mass of $SiO_2$ with respect to 100 parts by mass of barium titanate, and the mass ratio of boron to barium titanate is equivalent to 0.31 to 2.1 parts by mass of $B_2O_3$ with respect to 100 parts by mass of barium titanate.

8. The dielectric ceramic according to claim 1,
wherein the dielectric ceramic further contains silicon and lithium, wherein the mass ratio of silicon to barium titanate is equivalent to 0.73 to 6.3 parts by mass of $SiO_2$ with respect to 100 parts by mass of barium titanate, and the mass ratio of lithium to barium titanate is equivalent to 0.31 to 2.1 parts by mass of $Li_2O$ with respect to 100 parts by mass of barium titanate.

9. A capacitor, comprising a laminated body which comprises a plurality of dielectric layers and a plurality of conductor layers,
wherein each of the dielectric layers comprises the dielectric ceramic according to claim 1.

10. The capacitor, according to claim 9,
wherein the dielectric ceramic further contains silicon and boron, wherein the mass ratio of silicon to barium titanate is equivalent to 0.73 to 6.3 parts by mass of $SiO_2$ with respect to 100 parts by mass of barium titanate, and the mass ratio of boron to barium titanate is equivalent to 0.31 to 2.1 parts by mass of $B_2O_3$ with respect to 100 parts by mass of barium titanate.

11. The dielectric ceramic according to claim 10,
wherein the molar ratio of titanium with respect to barium is 0.97 to 0.98.

12. The capacitor, according to claim 9,
wherein the dielectric ceramic further contains silicon and lithium, and
wherein the mass ratio of silicon to barium titanate is equivalent to 0.73 to 6.3 parts by mass of $SiO_2$ with respect to 100 parts by mass of barium titanate, and the mass ratio of lithium to barium titanate is equivalent to 0.31 to 2.1 parts by mass of $Li_2O$ with respect to 100 parts by mass of barium titanate.

* * * * *